United States Patent
Cho et al.

(10) Patent No.: US 8,571,420 B2
(45) Date of Patent: Oct. 29, 2013

(54) APPARATUS AND METHOD FOR DRIVING WAVELENGTH-INDEPENDENT LIGHT SOURCE

(75) Inventors: Seung-Hyun Cho, Daejeon-si (KR); Han-Hyub Lee, Daejeon-si (KR); Jie-Hyun Lee, Daejeon-si (KR); Jong-Hoon Lee, Daejeon-si (KR); Eun-Gu Lee, Daejeon-si (KR); Eui-Suk Jung, Daejeon-si (KR); Sang-Soo Lee, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 90 days.

(21) Appl. No.: 13/334,115

(22) Filed: Dec. 22, 2011

(65) Prior Publication Data

US 2012/0163822 A1  Jun. 28, 2012

(30) Foreign Application Priority Data

Dec. 23, 2010  (KR) .................. 10-2010-0133792

(51) Int. Cl.
  *H04B 10/04*  (2011.01)
(52) U.S. Cl.
  USPC ............... 398/196; 398/197; 398/93; 398/94; 398/95; 398/195; 398/33; 398/38; 398/32; 398/72; 398/68; 372/32; 372/34; 372/36; 372/38.02
(58) Field of Classification Search
  USPC ........... 398/66, 67, 68, 69, 70, 71, 72, 98, 99, 398/100, 183, 192, 193, 194, 195, 196, 197, 398/198, 33, 38, 25, 26, 27, 30, 31, 32, 158, 398/159, 79, 95, 182, 91, 93, 94; 372/32, 372/34, 36, 38.02
  See application file for complete search history.

(56) References Cited

U.S. PATENT DOCUMENTS

| 7,302,182 B2 * | 11/2007 | Carrick et al. .................. 398/95 |
| 8,126,332 B2 * | 2/2012 | Bainbridge et al. ............ 398/95 |
| 2010/0046946 A1 * | 2/2010 | Cao et al. ......................... 398/72 |
| 2010/0119231 A1 | 5/2010 | Kim et al. |

FOREIGN PATENT DOCUMENTS

| KR | 2009-0023838 A | 3/2009 |
| KR | 2009-0106382 A | 10/2009 |

OTHER PUBLICATIONS

Sang-Rok Mun et al., "A Self Wavelength Tracking Method for a Cost Effective WDM-PON with Tunable Lasers", Conference on OFC/NFOEC, Mar. 21-25, 2010, pp. 1-3.

* cited by examiner

*Primary Examiner* — Hanh Phan
(74) *Attorney, Agent, or Firm* — Rabin & Berdo, P.C.

(57) ABSTRACT

An apparatus for driving a wavelength-independent light source is provided. The apparatus includes a seed light signal generation unit configured to generate seed light signals with one or more wavelengths based on a wavelength identification signal, a wavelength light detection unit configured to detect the wavelength identification signal from the seed light signals, an extraction unit configured to extract wavelength information corresponding to the detected wavelength identification signal and extract a driving condition of a wavelength-independent light source corresponding to the extracted wavelength information, and a driving unit configured to drive the wavelength-independent light source according to the extracted driving condition.

14 Claims, 4 Drawing Sheets

APPARATUS AND METHOD FOR DRIVING WAVELENGTH-INDEPENDENT LIGHT SOURCE

CROSS-REFERENCE TO RELATED APPLICATION(S)

This application claims the benefit under 35 U.S.C. §119(a) of Korean Patent Application No. 10-2010-0133792, filed on Dec. 23, 2010, in the Korean Intellectual Property Office, the entire disclosure of which is incorporated herein by reference for all purposes.

BACKGROUND

1. Field

The following description relates to extracting the driving conditions for a wavelength-independent light source and driving the wavelength-independent light source according to the extracted driving conditions.

2. Description of the Related Art

One of the most important factors in implementing a wavelength division multiplexing-passive optical network (WDM-PON) is a method of operating a colorless light source, such as, for example, a reflective semiconductor optical amplifier (RSOA), a reflective electro absorption modulator integrated with SOA (REAM-SOA) or a Fabry-Perot laser diode (FP-LD), which usually exhibits wavelength-independent characteristics and needs externally-injected light for fixing the wavelength of the wavelength-independent light source. In this case, such wavelength-independent light sources may simply amplify and modulate injected light without any knowledge of wavelengths allocated thereto or the power of the injected light, and then may transmit the amplified-and-modulated light to the outside thereof. Thus, the transmission performances of the wavelength-independent light source may deteriorate for a specific driving condition.

Therefore, a careful technique is needed to improve the transmission performances of a wavelength-independent light source by identifying necessary information such as wavelengths allocated to the wavelength-independent light source or the power of injected light, and driving the wavelength-independent light source optimally based on the identified information.

SUMMARY

The following description relates to identifying wavelength information based on a wavelength identification signal and driving a wavelength-independent light source optimally to improve the transmission performance of the wavelength-independent light source.

In one general aspect, there is provided an apparatus for driving a wavelength-independent light source, including: a seed light signal generation unit configured to generate seed light signals with one or more wavelengths based on a wavelength identification signal; a wavelength light detection unit configured to detect the wavelength identification signal from the seed light; an extraction unit configured to extract a wavelength information corresponding to the detected wavelength identification signal and extract a driving condition of a wavelength-independent light source corresponding to the extracted wavelength information; and a driving unit configured to drive the wavelength-independent light source according to the extracted driving condition.

The apparatus may further include a wavelength identification signal generation unit configured to generate the wavelength identification signal.

The apparatus may further include a multiplexing unit configured to generate a multiplexed signal by multiplexing the seed light signals.

The apparatus may further include a demultiplexing unit configured to demultiplex the multiplexed signal.

The wavelength identification signal may include a low-frequency signal having a pattern that repeats periodically.

The extracted driving condition may include a bias current condition and a modulation condition.

The wavelength-independent light source may include a reflective semiconductor optical amplifier (RSOA), a reflective electro absorption modulator integrated with SOA (REAM-SOA) or a Fabry-Perot laser diode (FP-LD).

In another general aspect, there is provided a method of driving a wavelength-independent light source, including: generating seed light signals with one or more wavelengths based on a wavelength identification signal; detecting the wavelength identification signal from the seed light signals; extracting a wavelength information corresponding to the detected wavelength identification signal; extracting a driving condition of a wavelength-independent light source corresponding to the extracted wavelength information; and driving the wavelength-independent light source according to the extracted driving condition.

The method may further include generating the wavelength identification signal.

The method may further include generating a multiplexed signal by multiplexing the seed light signals.

The method may further include demultiplexing the multiplexed signal.

The wavelength identification signal may include a low-frequency signal having a pattern that repeats periodically.

The extracted driving condition may include a bias current condition and a modulation condition.

The wavelength-independent light source may include an RSOA, a reflective electro absorption modulator integrated with SOA (REAM-SOA) or an FP-LD.

Other features and aspects may be apparent from the following detailed description, the drawings, and the claims.

Figure 1:
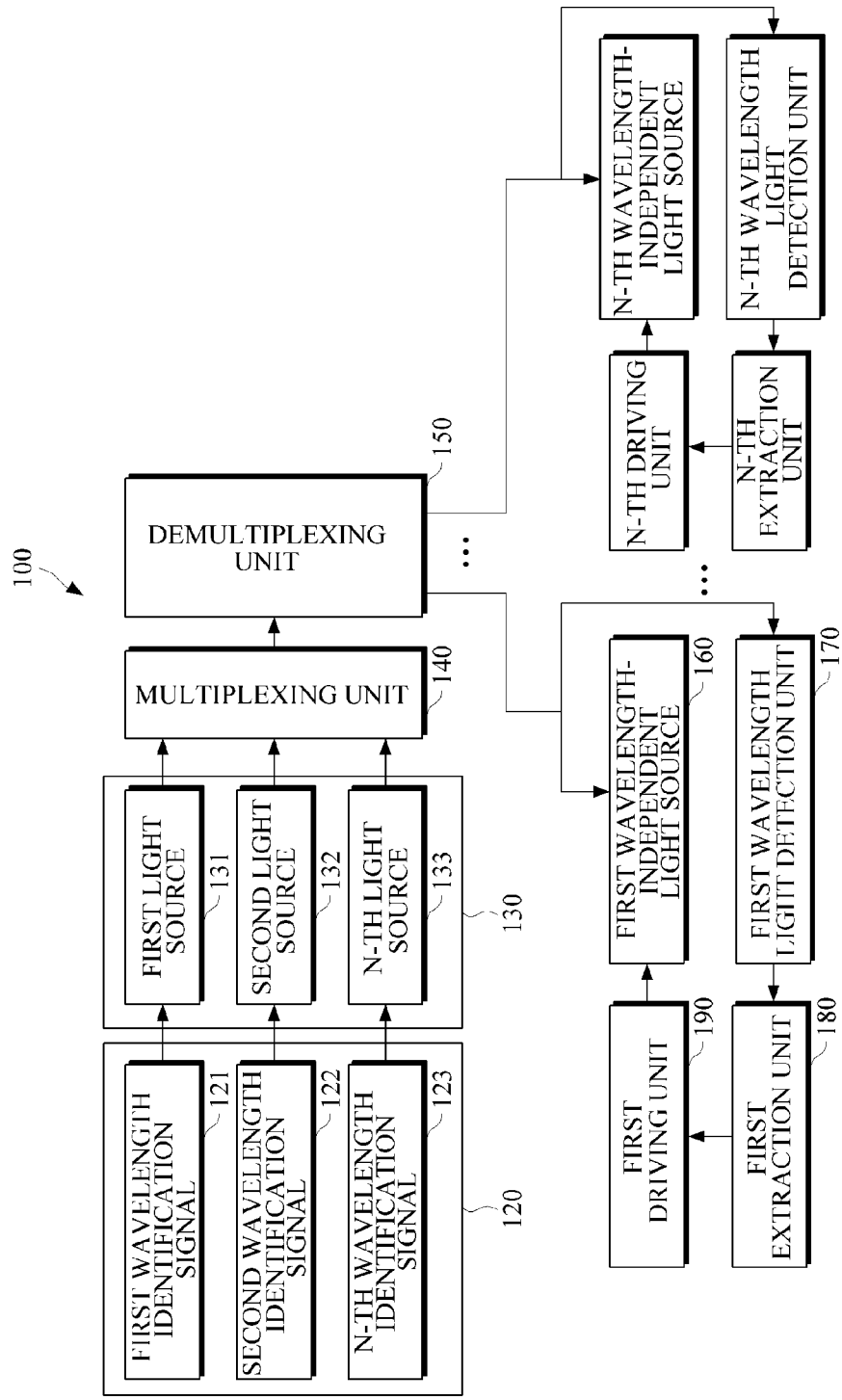
FIG. 1 is a diagram illustrating an example of an apparatus for driving a wavelength-independent light source.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of an apparatus for driving a wavelength-independent light source.

An apparatus for driving a wavelength-independent light source may be used for implementing a wavelength division multiplexing-passive optical network (WDM-PON) by use of both a light source, such as, for example, a reflective semiconductor optical amplifier (RSOA), REAM-SOA (reflective electro absorption modulator integrated with SOA) or a Fabry-Perot laser diode (FP-LD), which exhibits wavelength-independent characteristics and needs externally-injected light for fixing the wavelength.

Referring to FIG. 1, apparatus 100 includes a wavelength identification signal generation unit 120, a seed light signal generation unit 130, a multiplexing unit 140, a demultiplexing unit 150, a first wavelength-independent light source 160, a first wavelength light detection unit 170, a first extraction unit 180, and a first driving unit 190. For example, assume that the apparatus 100 is provided in an optical service provider.

The wavelength identification signal generation unit 120 may generate one or more wavelength identification signals respectively corresponding to one or more pieces of wavelength information. For example, the wavelength identification signals may be low-frequency signals, and may have a pattern that repeats periodically. For example, the wavelength identification signals may be digitally represented as binary numbers having a pattern that repeats periodically such as, for example, '10101010,' '11110000,' '11001100,' or the like.

For example, the wavelength identification signal generation unit 120 may generate a first wavelength identifier signal 121 corresponding to a first wavelength information, may generate a second wavelength identifier signal 122 corresponding to a second wavelength information, and may generate a third wavelength identifier signal 123 corresponding to a third wavelength information.

For example, the wavelength identification signal generation unit 120 may be implemented as a quartz vibrator or an oscillator.

The seed light signal generation unit 130 may generate a plurality of seed light signals with different wavelengths based on a wavelength identification signal that is provided by the wavelength identification signal generation unit 120. For example, the seed light signal generation unit 130 may generate continuous waves with different wavelengths based on the wavelength identification signal. The seed light signal generation unit 130 may include a plurality of light sources, for example, first, second, and N-th light sources 131, 132, and 133. For example, laser diodes such as, for example, a distributed feedback-laser diode (DFB-LD) or a distributed Bragg reflector-laser diode (DBR-LD), that can oscillate in a single-longitudinal mode in response to a current being applied thereto may be used as the first, second, and N-th light sources 131, 132, and 133. For example, the seed light signals may serve as carriers.

The multiplexing unit 140 may receive the seed light signals from the seed light signal generation unit 130, may multiplex the seed light signals, and may transmit the result of the multiplexing to the demultiplexing unit 150. For example, the multiplexing unit 140 may generate a single multiplexed signal by multiplexing the seed light signals.

The demultiplexing unit 150 may receive the multiplexed signal from the multiplexing unit 140, and may demultiplex the multiplexed signal. For example, the demultiplexing unit 150 may obtain one or more wavelength signals by demultiplexing the multiplexed signal.

The first wavelength-independent light source 160 may amplify and modulate the wavelength signals provided by the demultiplexing unit 150. For example, the first wavelength-independent light source 160 may be an RSOA or an FP-LD.

The first wavelength light detection unit 170 may detect a wavelength identification signal from the wavelength signals provided by the demultiplexing unit 150.

The first extraction unit 180 may extract wavelength information corresponding to the detected wavelength identification signal. For example, in response to the detected wavelength identification signal being the first wavelength identification signal 121, the first extraction unit 180 may extract the first wavelength information. For example, in response to the detected wavelength identification signal being the second wavelength identification signal 122, the first extraction unit 180 may extract the second wavelength information.

The first extraction unit 180 may extract a wavelength-independent light source driving condition corresponding to the extracted wavelength information. For example, in response to the extracted wavelength information being the first wavelength information, the first extraction unit 180 may extract a wavelength-independent light source driving condition corresponding to the first wavelength information. For example, various driving conditions for various wavelength-independent light sources may be stored in a look-up table in advance. In this example, the various driving conditions may include a bias current condition and a modulation current condition.

The first driving unit 190 may drive the first wavelength-independent light source 160 according to the extracted driving condition. Accordingly, the first wavelength-independent light source 160 may be driven optimally according to the extracted wavelength information and the extracted driving condition.

For example, the apparatus 100 may include more than one wavelength-independent light source, more than one wavelength light detection unit, more than one extraction unit, and more than one driving unit. In this example, the numbers of wavelength-independent light sources, wavelength light detection units, extraction units, and driving units may correspond to the number of wavelength signals that are output by the demultiplexing unit 150.

In the example illustrated in FIG. 1, the apparatus 100 may identify wavelength information based on a wavelength identification signal, and may optimally drive a wavelength-independent light source based on the identified wavelength information. Therefore, it is possible to improve the transmission performance of the wavelength-independent light source.

Figure 2:
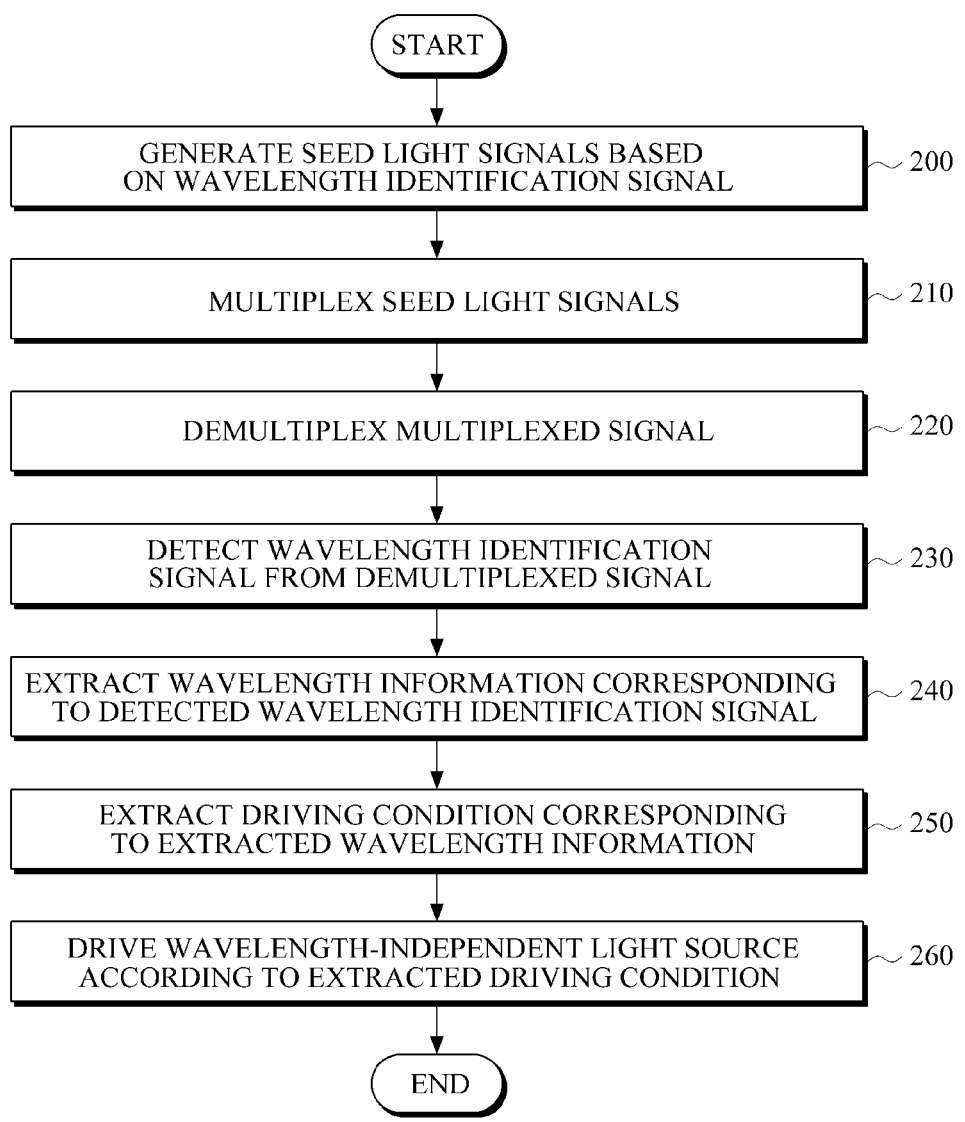
FIG. 2 is a flowchart illustrating an example of a method of driving a wavelength-independent light source.

FIG. 2 illustrates an example of a method of driving a wavelength-independent light source.

Referring to FIGS. 1 and 2, the apparatus 100 may generate one or more wavelength identification signals respectively corresponding to one or more pieces of wavelength information. In 200, the apparatus 100 may generate a plurality of seed light signals based on one of the generated wavelength identification signals. In 210, the apparatus 100 may generate a multiplexed signal by multiplexing the seed light signals. In 220, the apparatus 100 may demultiplex the multiplexed signal. In 230, the apparatus 100 may detect a wavelength identification signal from the demultiplexed signal. In 240, the apparatus 100 may extract wavelength information corresponding to the detected wavelength identification signal. In 250, the apparatus 100 may extract a wavelength-independent light source driving condition corresponding to the extracted wavelength information. For example, the extracted driving condition may be a bias current condition and a modulation condition. In 260, the apparatus 100 may drive a wavelength-independent light source according to the extracted driving condition. For example, the wavelength-independent light source may be an RSOA, REAM-SOA (reflective electro absorption modulator integrated with SOA) or a FT-LD.

Figure 3:
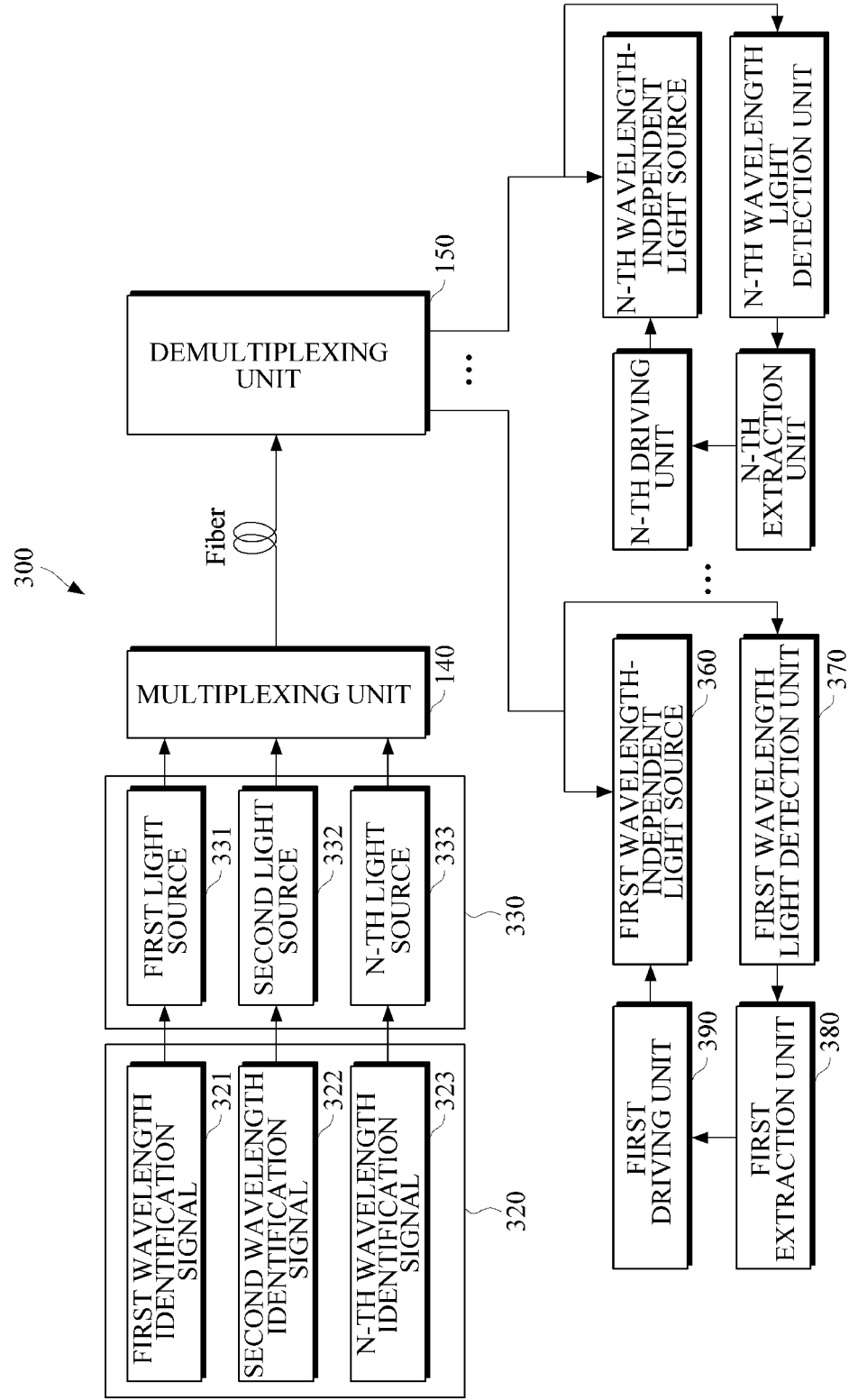
FIG. 3 is a diagram illustrating another example of an apparatus for driving a wavelength-independent light source.

FIG. 3 illustrates another example of an apparatus for driving a wavelength-independent light source.

An apparatus for driving a wavelength-independent light source may be used for implementing a wavelength division multiplexing-passive optical network (WDM-PON) by use of both a light source, such as, for example, a reflective semiconductor optical amplifier (RSOA), REAM-SOA (reflective electro absorption modulator integrated with SOA) or a Fabry-Perot laser diode (FP-LD), which exhibits wavelength-independent characteristics and needs externally-injected light for fixing the wavelength.

Referring to FIG. 3, apparatus 300 includes a wavelength identification signal generation unit 320, a seed light signal generation unit 330, a multiplexing unit 340, a demultiplexing unit 350, a first wavelength-independent light source 360, a first wavelength light detection unit 370, a first extraction unit 380, and a first driving unit 390. For example, assume that the apparatus 300 is provided in an optical service provider, and that the wavelength identification signal generation unit 320, the seed light signal generation unit 303, and the multiplexing unit 340 are provided in the optical service provider, and that the demultiplexing unit 350, the first wavelength-independent light source 360, the first wavelength light detection unit 370, the first extraction unit 380, and the first driving unit 390 are provided in an optical subscriber regime.

The wavelength identification signal generation unit 320 may generate one or more wavelength identification signals respectively corresponding to one or more pieces of wavelength information. For example, the wavelength identification signals may be low-frequency signals, and may have a typical pattern that repeats periodically. For example, the wavelength identification signals may be digitally represented as binary numbers having a pattern that repeats periodically such as, for example, '10101010,' '11110000,' '11001100,' or the like.

For example, the wavelength identification signal generation unit 320 may generate a first wavelength identifier signal 321 corresponding to first wavelength information, may generate a second wavelength identifier signal 322 corresponding to second wavelength information, and may generate a third wavelength identifier signal 323 corresponding to third wavelength information.

For example, the wavelength identification signal generation unit 320 may be implemented as a quartz vibrator or an oscillator.

The seed light signal generation unit 330 may generate a plurality of seed light signals with different wavelengths based on a wavelength identification signal that is provided by the wavelength identification signal generation unit 320. For example, the seed light signal generation unit 330 may generate continuous waves with different wavelengths based on the wavelength identification signal. The seed light signal generation unit 330 may include a plurality of light sources, for example, first, second, and N-th light sources 331, 332, and 333. For example, laser diodes such as, for example, a distributed feedback-laser diode (DFB-LD) or a distributed Bragg reflector-laser diode (DBR-LD), that can be operated in a single-longitudinal mode in response to a current being applied thereto may be used as the first, second, and N-th light sources 331, 332, and 333.

The multiplexing unit 340 may receive the seed light signals from the seed light signal generation unit 330, may multiplex the seed light signals, and may transmit the result of the multiplexing to the demultiplexing unit 350, which is located in the optical subscriber, via an optical fiber. For example, the multiplexing unit 340 may combine the seed light signals with different wavelengths into a single multiplexed signal.

The demultiplexing unit 350 may receive the multiplexed signal from the multiplexing unit 340, and may demultiplex the multiplexed signal. For example, the demultiplexing unit 350 may obtain one or more wavelength signals by demultiplexing the multiplexed signal.

The first wavelength-independent light source 360 may amplify and modulate the wavelength signals provided by the demultiplexing unit 350. For example, the first wavelength-independent light source 360 may be an RSOA or an FP-LD.

The first wavelength light detection unit 370 may detect a wavelength identification signal from the wavelength signals provided by the demultiplexing unit 350.

The first extraction unit 380 may extract wavelength information corresponding to the detected wavelength identification signal. For example, in response to the detected wavelength identification signal being the first wavelength identification signal 321, the first extraction unit 380 may extract the first wavelength information. For example, in response to the detected wavelength identification signal being the second wavelength identification signal 322, the first extraction unit 380 may extract the second wavelength information.

The first extraction unit 380 may extract a wavelength-independent light source driving condition corresponding to the extracted wavelength information. For example, in response to the extracted wavelength information being the first wavelength information, the first extraction unit 380 may extract a wavelength-independent light source driving condition corresponding to the first wavelength information. For example, various driving conditions for various wavelength-independent light sources may be stored in a look-up table in advance. In this example, the various driving conditions may include a bias current condition and a modulation condition.

The first driving unit 390 may drive the first wavelength-independent light source 360 according to the extracted driving condition. Accordingly, the first wavelength-independent light source 360 may be driven optimally according to the extracted wavelength information and the extracted driving condition.

For example, the apparatus 300 may include more than one wavelength-independent light source, more than one wavelength light detection unit, more than one extraction unit, and more than one driving unit. In this example, the numbers of wavelength-independent light sources, wavelength light detection units, extraction units, and driving units may correspond to the number of wavelength signals that are output by the demultiplexing unit 150.

In the example illustrated in FIG. 3, the apparatus 300 may identify wavelength information based on a wavelength identification signal, and may optimally drive a wavelength-independent light source based on the identified wavelength information. Therefore, it is possible to improve the transmission performance of the wavelength-independent light source.

Figure 4:
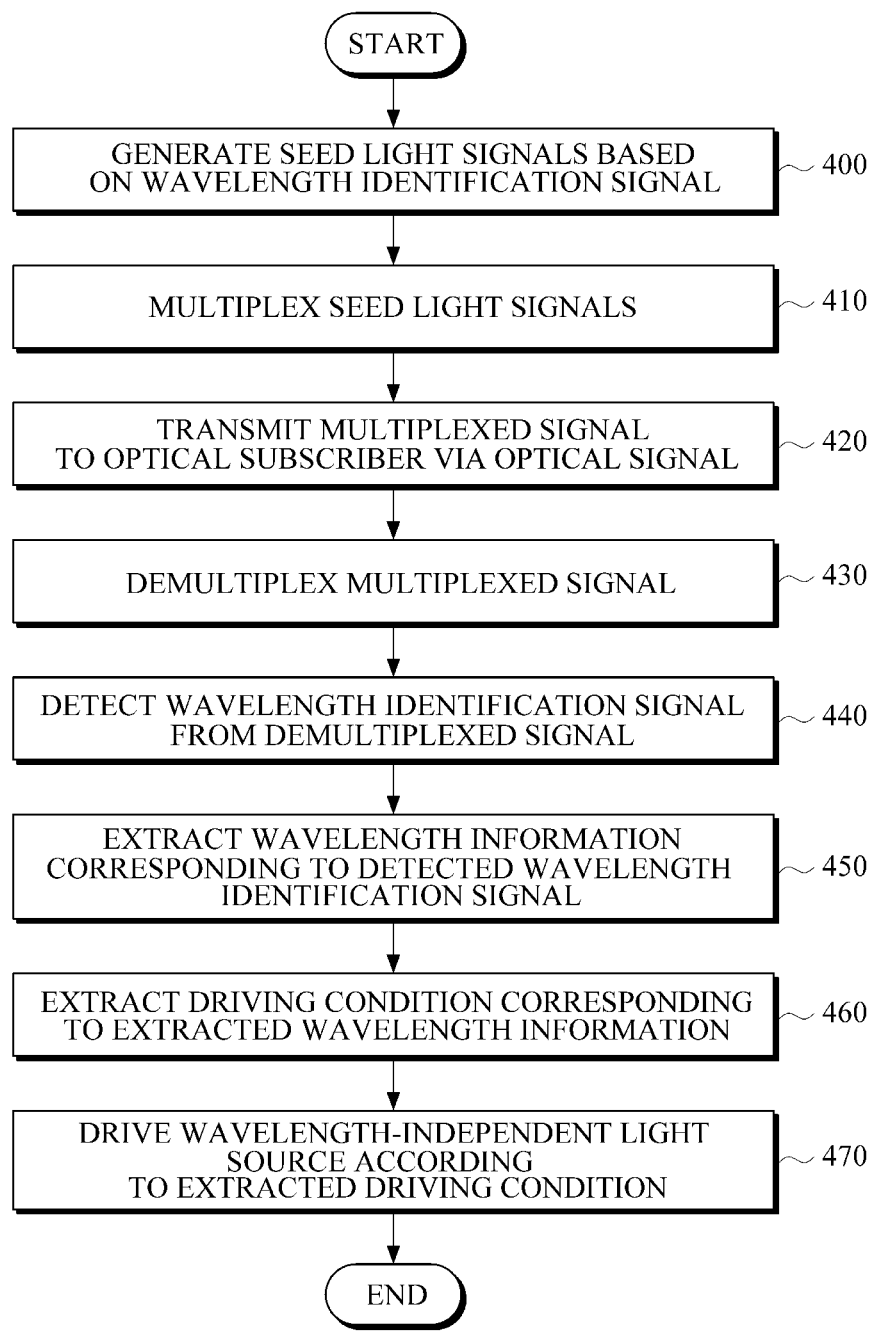
FIG. 4 is a flowchart illustrating another example of a method of driving a wavelength-independent light source.

FIG. 4 illustrates an example of a method of driving a wavelength-independent light source.

Referring to FIGS. 3 and 4, the apparatus 300 may generate one or more wavelength identification signals respectively corresponding to one or more pieces of wavelength information. In 400, the apparatus 300 may generate a plurality of seed light signals based on one of the generated wavelength identification signals. In 410, the apparatus 300 may generate a multiplexed signal by multiplexing the seed light signals. In 420, the apparatus 300 may transmit the multiplexed signal demultiplex to the optical subscriber via an optical fiber. In 430, the apparatus 300 may demultiplex the multiplexed signal. In 440, the apparatus 300 may detect a wavelength identification signal from the demultiplexed signal. In 450, the apparatus 300 may extract wavelength information corresponding to the detected wavelength identification signal. In 460, the apparatus 300 may extract a wavelength-independent light source driving condition corresponding to the extracted wavelength information. For example, the extracted driving condition may be a bias current condition and a modulation condition. In 470, the apparatus 300 may drive a wavelength-independent light source according to the extracted driving condition. For example, the wavelength-independent light source may be an RSOA, REAM-SOA (reflective electro absorption modulator integrated with SOA) or a FT-LD.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As described above, it is possible to improve the transmission performance of a wavelength-independent light source by identifying wavelength information based on a wavelength identification signal and optimally driving the wavelength-independent light source based on the identified wavelength information.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for driving a wavelength-independent light source, comprising:
    a seed light signal generation unit configured to generate seed light signals with one or more wavelengths based on a wavelength identification signal;
    a wavelength light detection unit configured to detect the wavelength identification signal from the seed light signals;
    an extraction unit configured to extract wavelength information corresponding to the detected wavelength identification signal and extract a driving condition of a wavelength-independent light source corresponding to the extracted wavelength information; and
    a driving unit configured to drive the wavelength-independent light source according to the extracted driving condition.

2. The apparatus of claim 1, further comprising:
    a wavelength identification signal generation unit configured to generate the wavelength identification signal.

3. The apparatus of claim 1, further comprising:
    a multiplexing unit configured to generate a multiplexed signal by multiplexing the seed light signals.

4. The apparatus of claim 3, further comprising:
    a demultiplexing unit configured to demultiplex the multiplexed signal.

5. The apparatus of claim 1, wherein the wavelength identification signal comprises a low-frequency signal having a pattern that repeats periodically.

6. The apparatus of claim 1, wherein the extracted driving condition comprises a bias current condition and a modulation condition.

7. The apparatus of claim 1, wherein the wavelength-independent light source comprises a reflective semiconductor optical amplifier (RSOA), a reflective electro absorption modulator integrated with SOA (REAM-SOA) or a Fabry-Perot laser diode (FP-LD).

8. A method of driving a wavelength-independent light source, comprising:
    generating seed light signals with one or more wavelengths based on a wavelength identification signal;
    detecting the wavelength identification signal from the seed light signals;
    extracting wavelength information corresponding to the detected wavelength identification signal;
    extracting a driving condition of a wavelength-independent light source corresponding to the extracted wavelength information; and
    driving the wavelength-independent light source according to the extracted driving condition.

9. The method of claim 8, further comprising:
generating the wavelength identification signal.

10. The method of claim 8, further comprising:
generating a multiplexed signal by multiplexing the seed light signals.

11. The method of claim 10, further comprising:
demultiplexing the multiplexed signal.

12. The method of claim 8, wherein the wavelength identification signal comprises a low-frequency signal having a pattern that repeats periodically.

13. The method of claim 8, wherein the extracted driving condition comprises a bias current condition and a modulation condition.

14. The method of claim 8, wherein the wavelength-independent light source comprises an RSOA, a reflective electro absorption modulator integrated with SOA (REAM-SOA) or an FP-LD.

* * * * *